United States Patent
Mina

[11] Patent Number: 6,123,487
[45] Date of Patent: Sep. 26, 2000

[54] DOUBLE-EDGED CUTTING TIP FOR DOUBLE-EDGED MILLING CUTTERS WITH SINGLE CUTTING TIP

[75] Inventor: Livio Mina, Brescia, Italy

[73] Assignee: Utensilaria SRL, Italy

[21] Appl. No.: 09/274,521

[22] Filed: Mar. 23, 1999

Related U.S. Application Data

[63] Continuation-in-part of application No. 08/989,628, Dec. 12, 1997, abandoned.

[30] Foreign Application Priority Data

Dec. 13, 1996 [IT] Italy .................................. BS96U0095

[51] Int. Cl.[7] .................................................... B23B 27/16
[52] U.S. Cl. ............................... 407/42; 407/54; 407/65; 407/114
[58] Field of Search .................... 407/35, 40, 42, 407/54, 65, 113, 114

[56] References Cited

U.S. PATENT DOCUMENTS

| | | | |
|---|---|---|---|
| 4,423,989 | 1/1984 | Kress et al. | 407/42 X |
| 5,064,316 | 11/1991 | Stojanovski | 407/40 |
| 5,108,234 | 4/1992 | Stojanovski | 407/40 |
| 5,915,888 | 6/1999 | Minicozzi | 407/54 |
| 5,971,671 | 10/1999 | Mina | 407/42 |

FOREIGN PATENT DOCUMENTS 0065149  11/1982  European Pat. Off. .................. 407/54

OTHER PUBLICATIONS

Kieninger product brochure sheet, Jan. 1889.

Millstar product brochure sheets, Jan. 1998.

*Primary Examiner*—Henry W. H. Tsai
*Attorney, Agent, or Firm*—William W. Jones

[57] ABSTRACT

A double-edged cutting tip for a doubled-edged milling cutter with single cutting tip, the cutting tip having a part-circular cutting tip front portion and including two cutting edge points in a cutting tip vertex, which, as seen in the rotational cutting direction of a respectively associated cutting edge, are located below the center with respect to a cutting tip axial plane.

11 Claims, 4 Drawing Sheets

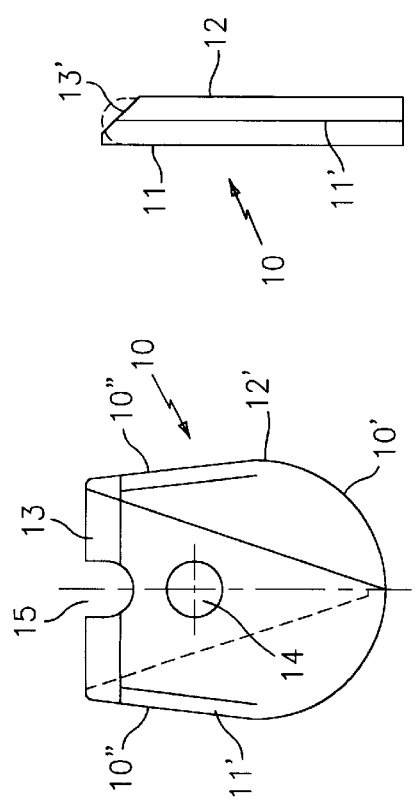
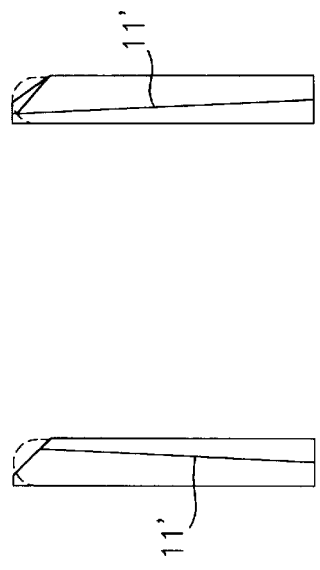
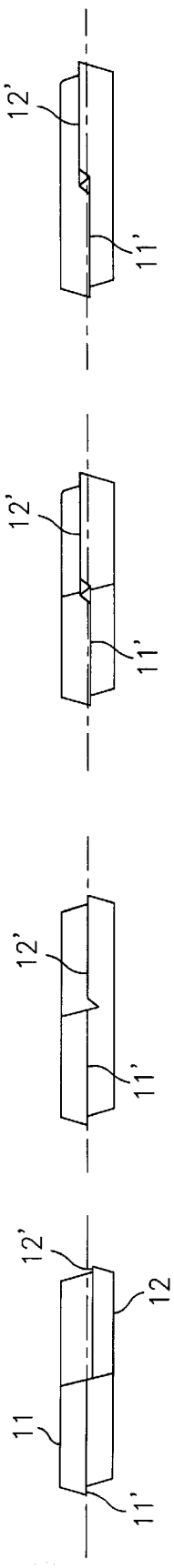

DOUBLE-EDGED CUTTING TIP FOR DOUBLE-EDGED MILLING CUTTERS WITH SINGLE CUTTING TIP

This application is a continuation in part of U.S. application Ser. No. 08/989,628 filed Dec. 12, 1997, now abandoned.

BACKGROUND OF THE INVENTION

The invention relates to double-edged cutting tips (inserts) for double-edged milling cutters equipped with only one single cutting tip. The cutting tip has a part-circular plate portion and a rear supporting face. Such a cutting tip is intended to be received in a transverse groove of a milling cutter body. The cutting tip is supported via its rear supporting face on a groove bottom of the transverse groove.

The cutting tip usually has a transverse bore in order to be able to attach the same to the milling cutter body by means of a mounting screw. Centering of the cutting tip within the milling cutter body can be effected either by means of the mounting screw or by means of a recess in the rear supporting face, which cooperates with a complementary projection in the region of the groove bottom of the transverse groove.

Such milling cutters are usually referred to as spherical milling cutters and are employed for copy milling. To this end, they should also be capable of "plunging-in or immersion", i.e. to perform milling also in axial direction of the milling cutter.

Such cutting tips usually have two spaced apart major faces which usually extend parallel to each other and preferably are plane-parallel. Furthermore, such cutting tips have oblique lateral faces, often referred to as flanks, which constitute an angle of less than 90° with the respectively associated major face and whose lines of intersection with the respectively associated major face constitute a cutting edge each. So-called front or rake faces of the cutting edges are constituted by or in the major faces. The rake faces may have specific shape features, for example chip forming recesses, in order to obtain a desired chip shape.

The plane of the cutting tip through which the milling cutter axis extends when the cutting tip is inserted in the transverse groove of the milling cutter body is referred to as axial plane of the cutting tip in the context of present invention. That location on the periphery of the part-circular cutting tip portion through which the milling cutter axis extends when the cutting tip is inserted in the transverse groove of the milling cutter body, is referred to as cutting tip point or vertex.

On one side of the cutting tip vertex, there is formed a first cutting edge at the intersection between one major face and the lateral face located there, whereas on the other side of the cutting tip vertex, there is formed a second cutting edge at the intersection between the other major face and the associated part of the lateral face.

To enable the spherical milling cutter to penetrate the workpiece during milling, there are basically different forms of realization.

According to a first form of realization, each one of the parallel major faces also forms the rake face of the corresponding cutting edge. Each cutting edge is thus disposed above center, i.e. above the axial plane of the cutting tip as seen in cutting direction of the respectively associated cutting edge. Each cutting edge, in the region of the cutting tip vertex, thus has its own cutting edge point which is also located above center. To permit such a milling cutter to penetrate the workpiece, the two cutting edge points are connected by a transverse cutting line which constitutes an angle of more than 90° with the axial plane of the cutting tip, as seen from the cutting edge of the respective major face towards the axial plane of the cutting tip. However, such a transverse cutting line has no cutting function but merely urges away the material to be milled. In the region of the milling cutter axis, the cutting speed of the cutting tip is thus zero and the milling cutter can only perform a pushing operation at this location. The longer the transverse cutting line is, the more pronounced cutting difficulties arise in the region of the cutting tip vertex. This problem can be reduced by reducing the length of the transverse cutting line. This can be achieved by forming recesses in both major faces in the region of the cutting tip vertex.

A second form of realization consists in lowering the rake face of each cutting edge with respect to the associated major face as far as the axial plane of the cutting tip. The two cutting edges are then both located in the axial plane of the cutting tip and constitute a common cutting edge point located on the milling cutter axis where the cutting speed is zero.

While a milling cutter having a cutting tip according to the latter realization is better capable of penetration during milling than milling cutters with a cutting tip according to the first-mentioned form of realization, there is, however, the disadvantage remaining that the cutting speed is zero at the cutting line tip or point. In case of a milling cutter having a cutting tip according to the latter form of realization, an additional disadvantage resides in that an inclination angle of zero is formed inevitably at the cutting edges located on the axial plane of the cutting tip. According to ISO standard, the inclination angle is understood to be the angle between the rake face or cutting edge and the axial plane of the milling cutter, i.e. the plane in which the cutting tip axial plane is located.

As is known, the disadvantage of an inclination angle of zero consists in that such a cutting edge geometry results in a jerk-like cutting operation, whereas cutting edges with an inclination angle other than zero (positive or negative, depending on the particular application) permit a smooth cutting operation.

SUMMARY OF THE INVENTION

It is the object of the invention to provide a double-edged cutting tip with improved plunge milling behavior. In particular, the cutting behavior in the region of the cutting tip point or cutting tip vertex is to be improved.

According to the invention, this object is met by a cutting tip in which the rake face of one cutting edge extends in the cutting tip axial plane and the rake face of the other cutting edge is disposed below center with respect to the cutting tip axial plane as seen in the rotational cutting direction of this cutting edge.

This object can also be met by a cutting tip in which the rake faces of both cutting edges extend in the cutting tip axial plane, with a small slope, which extends to a region below the cutting tip axial plane, being formed at an end of one rake face in the region of the cutting tip vertex.

Furthermore, this object can also be met by a cutting tip in which the rake faces of both cutting edges, as seen in the rotational cutting direction of the respective cutting edge, are located above center with respect to the cutting tip axial plane, with the cutting edge ends adjacent the cutting tip vertex being inclined in the direction of the cutting tip axial plane.

In addition thereto, this object can be met by a cutting tip in which the rake faces of both cutting edges are formed above center, with the ends of the two cutting edges adjacent the cutting tip vertex having two slopes leading under the cutting tip axial plane.

Furthermore, this object can be met by a double-edged cutting tip for a double-edged milling cutter with single cutting tip, the cutting tip having a part-circular cutting tip front part and having two cutting edge points in a cutting tip vertex which are located below center with respect to a cutting tip axial plane as seen in the rotational cutting direction of a respectively associated cutting edge.

A particularly preferred embodiment of the invention consists in a double-edged cutting tip for a double-edged milling cutter including only one cutting tip and a milling cutter body having a milling cutter axis and an axial transverse groove for receipt of the cutting tip, said cutting tip comprising:

two mutually spaced apart major faces and therebetween a cutting tip axial plane through which the milling cutter axis extends when the cutting tip is inserted in the transverse groove of the milling cutter body;

a cutting tip front portion having a part-circular periphery extending over at least 180;

a cutting tip vertex at that location of said part-circular periphery through which he milling cutter axis extends when the cutting tip is inserted in the transverse groove;

each major face having associated therewith a rake face that is recessed with respect thereto and has a rake face periphery coinciding with a corresponding part of the part-circular periphery and is located outside of the cutting tip axial plane in the region of the cutting tip vertex;

a lateral face extending from the respective rake face periphery and forming together with the respectively associated rake face an angle of less than 90° and the line of intersection thereof with the respectively associated rake face constituting a cutting edge;

each of the two cutting edges forming a cutting edge point in the region of the cutting tip vertex, and each of the two cutting tip points being located below center as seen in the rotational cutting direction of the respectively associated cutting edge.

This can be achieved by providing both cutting edges below center. However, it can also be achieved with a cutting tip in which the two cutting edges are located both above center and each of the two cutting edge points is brought to a position below center by providing a slope on the respectively associated cutting edge in the region of the cutting edge point thereof.

Between the two cutting edge points, there may be a connecting line forming an angle with the cutting tip axial plane which is not greater than 90°. The cutting tip can be provided with a recess in the region of the connecting line, such that the cutting edge points project in axial direction.

In a preferred embodiment of the invention, an important aspect consists in that the rake faces may be spatially oriented in arbitrary manner, i.e. may be lying in the plane of the major faces or lowered with respect to the major faces—in the latter case, they may be disposed above center or below center with respect to the cutting tip axial plane—and that each cutting edge has its cutting edge point that is not located in the cutting tip axial plane, but is disposed below center with respect to the same.

When the rake faces are located below center, this results automatically in that the cutting edge points of the two cutting edges are located below center. When, in contrast thereto, the rake faces are located above center, the cutting edge points thereof are brought to a position below center by a slope.

With such cutting tips, the connecting line connecting the two cutting edge points of the two cutting edges constitutes together with the cutting tip axial plane an angle which (in contrast to the afore-described cutting tip of the first form of realization) is not greater than 90° but is equal to or smaller than 90°, which as such already is favorable for the cutting operation. Due to the fact that the two cutting edge points are arranged below center, the transverse cutting line formed as such along the connecting line can be eliminated by a small recess in the region of the connecting line. As a consequence of this recess, the two cutting edge points project, whereby milling in a plunge-type mode is facilitated considerably, since positive relief angles result, which is not the case with the initially described cutting tip according to the first form of realization.

During mere plunge-type milling, i.e. a cutting movement of the milling cutter in the direction of its axis of rotation, a small projection may be left in case of such a cutting tip on the workpiece to be milled. However, this projection is easily milled away by the milling movement in radial direction that is always present in copy milling.

The rake faces of this cutting tip as well may be formed with specific chip shaping structures, for example chip shaping recesses.

With cutting tips according to the invention, the rear supporting face may be angled with respect to the major faces, with a complementary design of the shape of the groove bottom of the transverse groove of the milling cutter body, which results in more sturdy cutting tip attachment in the transverse groove and, in particular, to increased resistance against rotation of the cutting tip with respect to the milling axis of the milling cutter body during milling.

BRIEF DESCRIPTION OF THE DRAWINGS

In the following, embodiments of the invention will be elucidated in more detail with reference to the drawings. In the drawings:

FIG. 1 shows a front view of the cutting tip;

FIG. 2 shows a side view of the cutting tip shown in FIG. 1;

FIGS. 3 and 4 show side views of two modifications with respect to the cutting tip shown in FIG. 2;

FIGS. 5a to 5d show four different embodiments of rake faces of cutting tip cutting edges;

DESCRIPTION OF THE PREFERRED EMBODIMENTS

Figure 6:
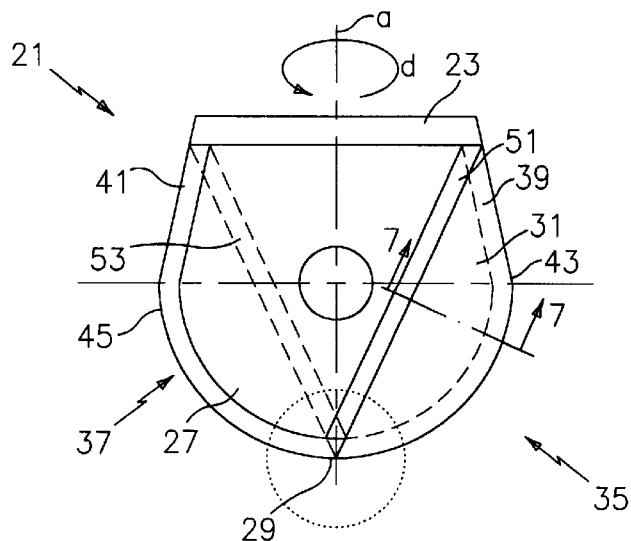
FIG. 6 shows a particularly preferred embodiment of a cutting tip according to the invention.

The cutting tip shown in FIG. 1 has a plate- or disk-shaped body 10 having two faces 11 and 12 facing away from each other and extending substantially parallel to each other and defining the thickness of the cutting tip, cutting edges 11' and 12' facing away from each other, a rear plane or a back 13, and a transverse bore 14. The transverse bore serves for receipt of a fixing screw of the cutting tip to fasten the cutting tip in a recess of milling cutter body, not shown.

The body 10 of the cutting tip preferably has a circular section 10' in the portion facing away from the rear plane or back 13, and this circular section with sides 10" facing away from each other and converging towards the rear or back plane 13 merges in an essentially trapezoidal section. In other words: the width of body 10 becomes progressively smaller starting from the outer parts of the circular section 10' to the rear or back plane 13 of the cutting tip, with the sides, that face away from each other and constitute the trapezoidal portion, being rectilinear or curved.

This construction of the cutting tip does not only provide protection of the body of the milling cutter against hitting the wall of the workpiece just worked on and against the influence of the chips, but in addition thereto renders possible return milling in the lifted state, for example for the purpose of obtaining an improved surface smoothness.

The shape of the cutting tip body permits a placement of the bore 14 for the fixing screw considerably above the circle center of the circular section of the cutting tip, whereby the clearances for chip removal can be increased considerably.

The rear or back plane 13 which is formed such that it positively fits in the bottom of the recess of the milling cutter body is inclined or angled with respect to the major faces of the cutting tip. Accordingly, the receiving recess for the cutting tip in the milling cutter body has a bottom recess of complementary design, for receiving the inclined back 13' of the cutting tip, which results in a sturdier clamping effect. In operation, the cutting forces between the inclined coupling between cutting tip back and receiving recess eliminate any play both towards the rear and between the faces of the cutting tip and the walls of the recess.

Centering of the cutting tip in the recess and with respect to the milling cutter body is reached by a rear precision recess 15 which can be formed in the back of the cutting tip in considerably simpler and more economic manner than a bore.

This recess 15 is provided for cooperation with an appropriate projection of the milling cutter body or with a pin in the bottom of the receiving recess, as it is pointed out furthermore in more detail in U.S. patent application Ser. No. 08/989,628 of the applicant. However, due to the fact that the positioning accuracy is obtained independently of the bore 14 of the cutting tip, this bore can be formed in coarse manner, and in particular can be made by sintering without subsequent expensive grinding operation.

The cutting edges 11' and 12' can extend in axial direction, i.e. they are arranged in a diametral plane of the milling cutter, as shown in FIG. 2, or they may be inclined in the one or the other direction by forming a specific angle with the origin at the intersection of the milling cutter axis with the theoretical spherical shape. (cf. FIGS. 3 and 4).

The rake faces belonging to the cutting edges 11' and 12' may have a variety of designs, with various embodiments being shown in FIGS. 5a to 9:

a) One of the rake faces extends axially, i.e. it extends in the axial plane of the cutting tip; the other rake face extends slightly below center, i.e. it does not extend in the axial plane of the cutting tip (FIG. 5a). This embodiment improves the cutting conditions in the front region in the vicinity of the milling cutter axis, i.e. the cutting tip vertex or point, since the accuracy is reached by one of the radii, without influence by the other.

b) Both rake faces extend in the axial plane of the cutting tip, but the front end of one rake face is provided with a small slope (FIG. 5b), whose end is disposed below the center—similar to a), which provides the advantage of increased sturdiness, without the accuracy being impaired thereby.

c) Both rake faces are above center—FIG. 5c—and between the two ends thereof in the vicinity of the axis corresponding to the milling cutter axis they extend between two small slopes on the axis. The cutting edges are much sturdier, while however accepting slight inaccuracies that are tolerable for rough working, but which definitely can be corrected when performing the profile correction during grinding of the circumferential relief.

d) A design according to c), however with the difference that the slopes extend at the end of the above-center radii; this solution leads to similar inaccuracies as mentioned under c), but in still more distinctive manner. However they definitely can be eliminated during profile grinding.

e) A design analogous to a) to d) in conjunction with an inclination of the rake faces and cutting edges in the manner shown in FIG. 3 or FIG. 4. This embodiment has the advantage that the cut takes place more gently, with the penetration time of the cutting edge into the workpiece being longer. However, this leads to the disadvantage that a correction of the profile is necessary during circumferential grinding.

f) Preferred embodiments of cutting tips according to the invention are shown in FIGS. 7 to 9a. In all of these embodiments each cutting edge has its own cutting edge tip or point and both cutting edge points, as seen in the rotational cutting direction of the respective cutting edge, are always located below center with respect to the axial plane of the cutting tip, irrespective of whether the rake faces and thus the cutting edges are disposed below center or above center.

Figure 7:
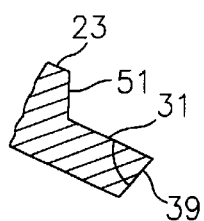
FIG. 7 shows a sectional view of part of the cutting tip of FIG. 6, along sectional line A—A.

FIG. 6 shows a plan view of a particularly preferred cutting tip 21 having two plane-parallel major faces 23 and 25 and an axial cutting tip plane m therebetween through which a milling cutter axis a extends when cutting tip 21 is inserted in a transverse groove of a milling cutter body. Cutting tip 21 has a cutting tip front part 27 with a part-circular periphery extending over at least 180°. At that location of the part-circular periphery through which the milling cutter axis a extends when cutting tip 21 is inserted in the transverse groove of the milling cutter body, there is located a cutting tip point or vertex 29. Each of the two major faces 23 and 25 has a rake face 31 and 33, respectively, associated therewith which is recessed with respect to the respectively associated major face 23 or 25 and which has a rake face periphery 35 and 37, respectively, coinciding with a corresponding part of the part-circular periphery, and which is located outside the cutting tip axial plane m in the region of cutting tip vertex 29. Extending from the rake face periphery 35 and 37, respectively, of each rake face 31 and 33, respectively, is a lateral face 39 and 41, respectively, which together with the respectively associated rake face 31 and 33 constitutes an angle of less than 90°, as can be seen best in FIG. 7 showing a fragmentary sectional view of cutting tip 21 along sectional line 7—7 in FIG. 6.

The line of intersection between the respective rake face 31, 33 and the respectively associated lateral face 39, 41 constitutes a cutting edge 43 and 45, respectively, belonging to the respective rake face 31, 33. Each of the two cutting edges 43, 45, in the region of the cutting tip vertex 29, constitutes a cutting edge point 47 and 49, respectively. Between the major faces 23, 25 and the respectively associated rake face 31, 33, there is disposed an inclined step 51 and 53, respectively.

Figure 8:
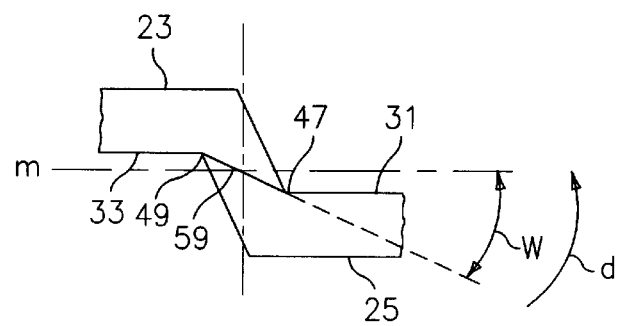
FIG. 8 shows a sectional view of a part of the cutting tip of FIG. 6, marked with a dotted circle in FIG. 6, in an embodiment with two rake faces below center.
Figure 8A:
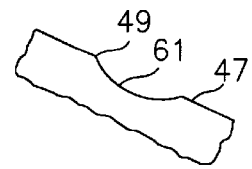
FIG. 8a shows a modification of the structure shown in FIG. 8 with a recess.
Figure 9:
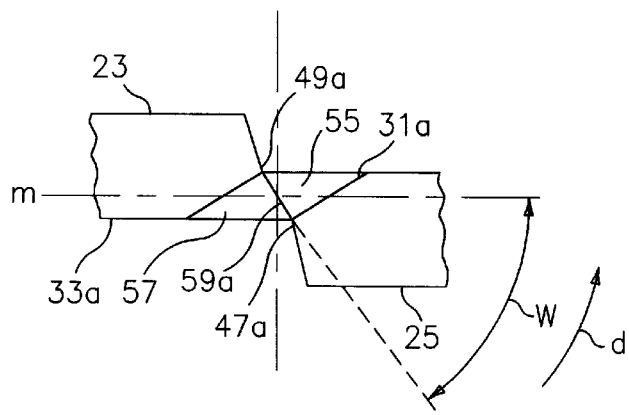
FIG. 9 shows an embodiment of the part of the cutting tip enclosed by the dotted circle in FIG. 6, having two rake faces above center.
Figure 9A:
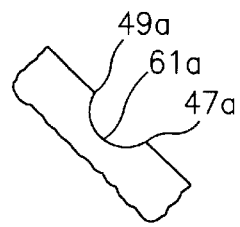
FIG. 9a shows a modification of the structure shown in FIG. 9 with a recess.

FIGS. 8 and 9 show sections in the region of the dotted circle in FIG. 6 for various embodiments, with the associated FIGS. 8a and 9a each showing a variation of the structure of FIG. 8 and 9, respectively.

FIG. 8 illustrates a cutting tip 21 of the type shown in FIG. 6 in the region of its cutting tip vertex 29 for an embodiment in which the two rake faces 31 and 33, as seen in the rotational cutting direction of the respectively associated cutting edge 43 and 45, respectively, are disposed below center with respect to the cutting tip axial plane m. In FIGS. 6, 8 and 9, the rotational cutting directions are indicated by a rotational arrow d.

In contrast thereto, FIG. 9 shows an embodiment of the cutting tip 21 illustrated in FIG. 6, in which the rake faces 31a and 33a are disposed above center with respect to the cutting tip axial plane. In the embodiment shown in FIG. 8, the cutting edge points 47 and 49, due to the below-center position of rake faces 31 and 33, are also disposed below center when no further measures are taken. However, due to the fact that, in the embodiment shown in FIG. 9, the rake faces 31a and 33a are disposed above center, their cutting edge points also would be disposed above center without additional measures. However, since the cutting edge points of the cutting tip shown in FIG. 6 should always be located below center, the embodiment shown in FIG. 9, in the region of cutting tip vertex 29, is provided with slopes 55 and 57 by means of which the cutting edge points 47a and 49a belonging to the above-center rake faces 31a and 33a, respectively, are brought to a position below center with respect to the cutting tip axial plane m.

In the two embodiments according to FIGS. 8 and 9, transverse cutting lines 59 and 59a, respectively, are located between cutting edge points 47, 49 and 47a, 49a, respectively, which constitute an angle w of no more than 90° with respect to the cutting tip axial plane m. A transverse cutting line extending in this manner as such is already favorable with respect to the cutting operation in the region of the cutting tip vertex.

Modifications of the two embodiments depicted in FIGS. 8 and 9 are shown in FIGS. 8a and 9a. In each of these two modifications, a recess 61 and 61a is located in the region of the transverse cutting line 59 and 59a, respectively, with said recess being preferably of concave configuration. These recesses 61, 61a have the effect that the cutting edge points 47, 49 and 47a, 49a, respectively, are projecting, with the consequence that plunge-type milling is facilitated considerably since the recesses 61, 61a result in a positive relief angle.

Figure 11:
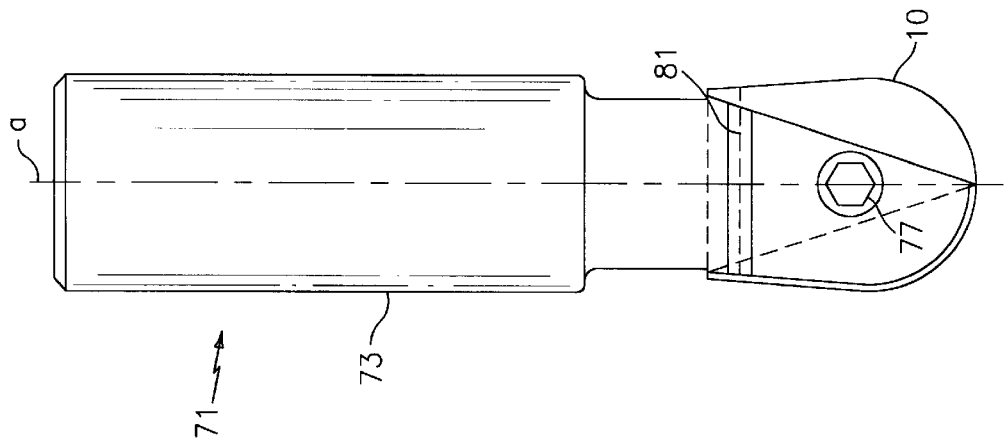
FIG. 11 shows a second side view of the milling cutter shown in FIG. 10.
Figure 10:
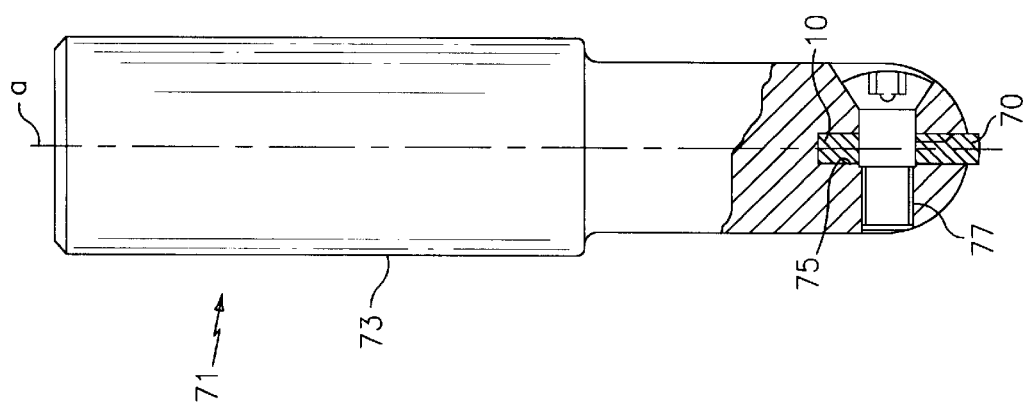
FIG. 10 shows a first embodiment of a milling cutter in a first side view.

An exemplary embodiment of a milling cutter 71 having a milling cutter body 73 and a cutting tip 10 which is disposed in a transverse groove 75 arranged axially with respect to a milling cutter axis a and which is attached by means of a fixing screw 77 is shown in FIGS. 10 and 11 in two side views rotated by 90° in relation to each other, with FIG. 10 being illustrated partly in section. The cutting tip inserted in trans5 verse groove 75, however, may also be the cutting tip 21 shown in FIG. 6, irrespective of whether it is formed according to FIG. 8 or according to FIG. 9.

Figure 13:
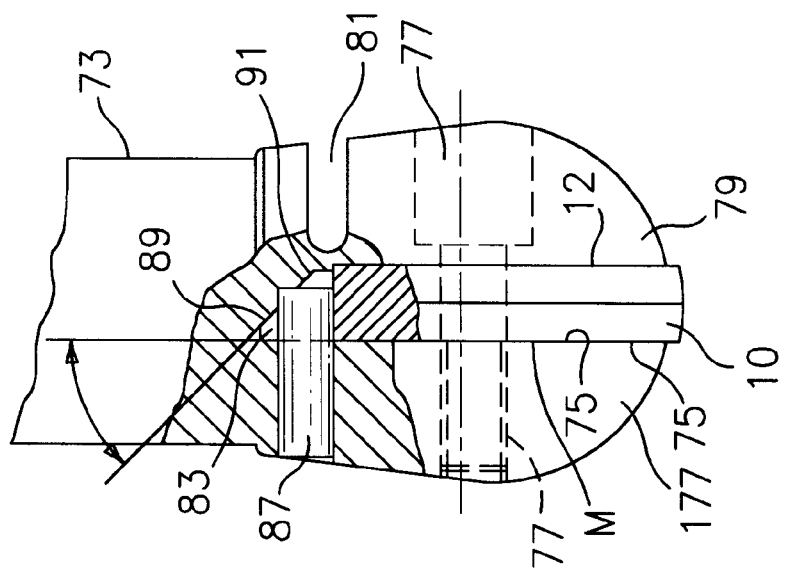
FIG. 13 shows another side view, partly in section, of the embodiment shown in FIG. 12.
Figure 12:
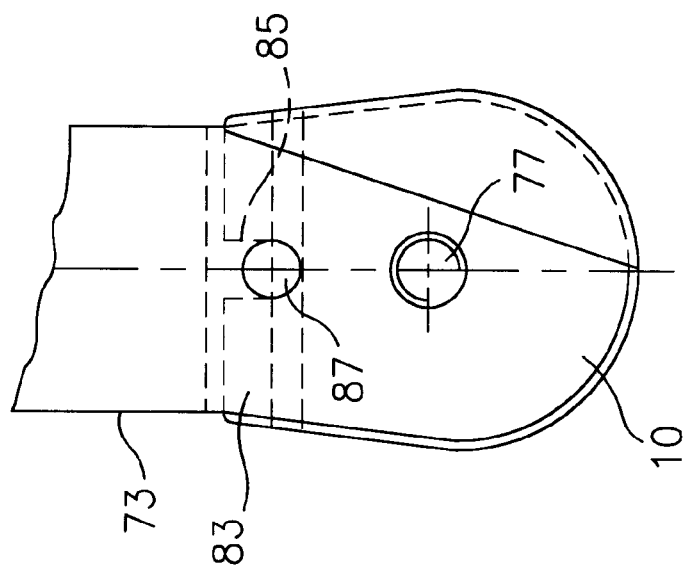
FIG. 12 shows a part of a second embodiment of a milling cutter in a first side view.

In FIGS. 12 and 13, the cutting tip 10 and the front part of the milling cutter body 73 holding the same are shown in more detail. Transverse groove 75 is confined by two mutually opposite, spaced apart milling cutter legs 177 and 79 between which cutting tip 10 is received. The left-hand milling cutter leg 77 in FIG. 13 is relatively rigid, whereas the right-hand milling cutter leg 79 in FIG. 13 is provided with increased flexural elasticity due to a recess 81 reducing the cross-sectional area thereof. As shown in FIG. 12, recess 81 extends across the entire width of milling cutter leg 79. The rigid milling cutter leg 75 constitutes a rigid abutment area that may serve as a reference surface for cutting tip 10, whereas milling cutter leg 79, due to its increased elasticity effected by recess 81, may serve as a clamping leg for cutting tip 10, as elucidated in more detail in the applicant's afore-mentioned U.S. patent application Ser. No. 08/989,628.

Cutting tip 10, in its rear portion 83, has a centering recess 85 cooperating with a centering bolt 87 for exactly positioning cutting tip 10 within transverse groove 75.

As can be seen from FIG. 13, cutting tip 10 has a rear 35 supporting face 89 which, with respect to the plane-parallel major faces 11 and 12 of cutting tip 10, includes an angle different from 90°. A groove bottom 91 of transverse groove 75 has a complementary inclined configuration. These slopes of rear supporting face 89 and groove bottom 91 have the effect that torques exerted during the rotational milling operation of the milling cutter on the cutting tip 10, are taken up largely by the inclined groove bottom 91. The tendency of the milling cutter legs 75 and 79 to spread apart during milling is reduced thereby.

What is claimed is:

1. A partly spherical cutting tip for double-edged milling cutters with single cutting tip received in a recess of a milling cutter body and being fixed by means of a transverse screw and comprising a plate-shaped tip body having two parallel face sides facing away from each other, two cutting edges facing away from each other and arranged in a diametral plane of the milling cutter, rake faces, a back for abutment on a bottom wall of the recess, and a bore for a mounting screw for mounting the cutting tip to the milling cutter body, the back of the plate-shaped body being designed such that it forms a tight, positive connection with the bottom wall of the recess of the milling cutter body, wherein the rake face of one cutting edge of the cutting tip is disposed in said milling cutter diametral plane and the rake face of the other cutting edge is offset from said milling cutter diametral plane.

2. A partly spherical cutting tip for double-edged milling cutters with single cutting tip received in a recess of a milling cutter body and being fixed by means of a transverse screw and comprising a plate-shaped tip body having two parallel face sides facing away from each other, two cutting edges facing away from each other and arranged in a diametral plane of the milling cutter, rake faces, a back for abutment on a bottom wall of the recess, and a bore for a mounting screw for mounting the cutting tip to the milling cutter body, the back of the plate-shaped body being designed such that it forms a tight, positive connection with the bottom wall of the recess of the milling cutter body, wherein the rake faces of both cutting edges are disposed in said milling cutter diametral plane and extend in an axial direction, with a small slope being formed at one end of one of said rake faces, which slope extends below the milling cutter diametral plane.

3. A double-edged cutting tip for a double-edged milling cutter having only one cutting tip and a milling cutter body which has a milling cutter axis and an axial transverse groove for receipt of the cutting tip; said cutting tip comprising: two mutually spaced apart major faces and therebetween a cutting tip axial plane through which the milling cutter axis extends when the cutting tip is inserted in the transverse groove of the milling cutter body; a cutting tip front portion having a part-circular periphery extending over at least 180°; a cutting tip vertex at [that] an axial location of the part-circular periphery through which the milling cutter axis extends when the cutting tip is inserted in the transverse groove; each major face having associated therewith a rake face which is recessed with respect to the respectively associated major face and has a rake face periphery coinciding with the corresponding portion of the part-circular periphery and which, in the region of the cutting tip vertex, is located outside of the cutting tip axial plane; a lateral face extending away from the respective rake face periphery and forming with the respectively associated rake face an angle of less than 90° and a line of intersection thereof with the respectively associated rake face constituting a cutting edge; each of the two cutting edges, in the region of the cutting tip vertex, constituting a cutting edge point and each of the two cutting edge points, as seen in the rotational cutting direction of the respectively associated cutting edge, being located below center with respect to the cutting tip axial plane; and wherein each of the two cutting edges, as seen in the rotational cutting direction of the respective cutting edge, is disposed below center with respect to the cutting tip axial plane.

4. The cutting tip of claim 3, wherein a rear supporting face thereof is angled with respect to the two major faces, the angles between the supporting face and the two major faces being different from 90° each.

5. The cutting tip of claim 4, comprising a positioning recess in the rear supporting face for cooperating with a positioning projection on the milling cutter body formed complementary to the positioning recess, so as to position the cutting tip.

6. A double-edged spherical milling cutter having only one cutting tip and a milling cutter body which has a milling cutter axis and an axial transverse groove for receipt of the cutting tip; said cutting tip comprising; two mutually spaced apart major faces and therebetween a cutting tip axial plane through which the milling cutter axis extends; a cutting tip front portion having a part-circular periphery extending over at least 180°; a cutting tip vertex at an axial location of the part-circular periphery through which the milling cutter axis extends; each major face having associated therewith a rake face which is recessed with respect to the same and has a rake face periphery coinciding with the corresponding portion of the part-circular periphery and which, in the region of the cutting tip vertex, is located outside of the cutting tip axial plane; a lateral face extending away from the respective rake face periphery and forming with the respectively associated rake face an angle of less than 90° and a line of intersection thereof with the respectively associated rake face constituting a cutting edge; each of the two cutting edges, in the region of the cutting tip vertex, constituting a cutting edge point and each of the two cutting edge points, as seen in the rotational cutting direction of the respectively associated cutting edge, being located below center with respect to the cutting tip axial plane and wherein each of the two cutting edges, as seen in the rotational cutting direction of the respective cutting edge, is disposed below center with respect to the cutting tip axial plane.

7. The milling cutter of claim 6, wherein a rear supporting face is angled with respect to the two major faces, the angles between the supporting face and the two major faces being different from 90° each.

8. The milling cutter of claim 6, wherein the cutting tip has a positioning recess in a rear supporting face and the milling cutter body has a positioning projection of complementary configuration, the positioning projection and the positioning recess cooperating for positioning the cutting tip in centered manner.

9. The milling cutter of claim 6, wherein the milling cutter body and tip each have a transverse bore for receipt of a cutting tip mounting screw and wherein the transverse groove of the milling cutter body is formed between two mutually opposed, spaced apart milling cutter legs, one thereof being substantially rigid and forming a reference abutment face for positioning the cutting tip in the transverse groove and the other one thereof, positioned on a side of the transverse bore of the milling cutter body remote from the cutting tip vertex, being provided with a recess reducing the cross-section of the same and thus increasing the flexural elasticity of the same.

10. A partly spherical cutting tip for double-edged milling cutters with a single cutting tip received in a recess of a milling cutter body and being fixed by means of a transverse screw and comprising a plate-shaped tip body having first and second parallel major face sides facing away from each other and first and second parallel rake faces facing away from each other, said rake faces terminating in first and second cutting edges facing away from each other, said first major face side being connected to said first rake face by an inclined lateral face, and said second major face and said second rake face being interconnected by a second inclined lateral face, said first and second lateral faces merging with said first and second cutting edges respectively, and said first and second lateral faces forming first and second cutting edge points at their intersections with said first and second cutting edges; said first major face and said first rake face being disposed on a first side of a diametral plane of the milling cutter and said first cutting edge point being disposed on a second opposite side of said milling cutter diametral plane; and said second major face and said second rake face being disposed on said second side of said milling cutter diametral plane and said second cutting edge point being disposed on said first side of said milling cutter diametral plane.

11. A partly spherical cutting tip for double-edged milling cutters with a single cutting tip received in a recess of a milling cutter body and being fixed by means of a transverse screw and comprising a plate-shaped tip body having first and second parallel major face sides facing away from each other and first and second parallel rake faces facing away from each other, said rake faces terminating in first and second cutting edges facing away from each other, said first major face side being connected to said first rake face by an inclined lateral face, and said second major face and said second rake face being interconnected by a second inclined lateral face, said first and second lateral faces merging with said first and second cutting edges respectively, and said first and second lateral faces forming first and second cutting edge points at their intersections with said first and second cutting edges; said first major face and said first rake face being disposed on opposite sides of a diametral plane of the milling cutter and said first cutting edge point being disposed on the same side of said milling cutter diametral plane as said first rake face; and said second major face and said second rake face being disposed on opposite sides of said diametral plane of the milling cutter and said second cutting edge point being disposed the same side of said milling cutter diametral plane as said second rake face.

* * * * *